US010712002B2

(12) United States Patent
Masquelet et al.

(10) Patent No.: US 10,712,002 B2
(45) Date of Patent: Jul. 14, 2020

(54) COMBUSTOR ASSEMBLY FOR USE IN A GAS TURBINE ENGINE AND METHOD OF ASSEMBLING

(71) Applicant: General Electric Company, Schenectady, NY (US)

(72) Inventors: Matthieu Marc Masquelet, Niskayuna, NY (US); Narendra Digamber Joshi, Niskayuna, NY (US); Venkat Eswarlu Tangirala, Niskayuna, NY (US); Sarah Marie Monahan, Latham, NY (US)

(73) Assignee: General Electric Company, Schenectady, NY (US)

(*) Notice: Subject to any disclaimer, the term of this patent is extended or adjusted under 35 U.S.C. 154(b) by 371 days.

(21) Appl. No.: 14/801,962

(22) Filed: Jul. 17, 2015

(65) Prior Publication Data

US 2017/0016620 A1    Jan. 19, 2017

(51) Int. Cl.
| F23R 3/00 | (2006.01) |
| F23R 3/28 | (2006.01) |
| F23R 3/60 | (2006.01) |
| F23R 3/10 | (2006.01) |
| F23R 3/26 | (2006.01) |
| F23R 3/20 | (2006.01) |
| F23R 3/04 | (2006.01) |

(52) U.S. Cl.
CPC .............. *F23R 3/002* (2013.01); *F23R 3/04* (2013.01); *F23R 3/10* (2013.01); *F23R 3/20* (2013.01); *F23R 3/26* (2013.01); *F23R 3/28* (2013.01); *F23R 3/283* (2013.01); *F23R 3/60* (2013.01); *F23R 2900/00017* (2013.01); *Y02E 20/14* (2013.01)

(58) Field of Classification Search
CPC .. F02C 7/20; F23R 2900/00017; F23R 3/002; F23R 3/04; F23R 3/283; F23R 3/286; F23R 3/60
See application file for complete search history.

(56) References Cited

U.S. PATENT DOCUMENTS

| 3,780,529 | A | * | 12/1973 | Johnson | F23R 3/10 60/804 |
| 4,180,972 | A | * | 1/1980 | Herman | F23R 3/60 60/751 |
| 4,232,527 | A | * | 11/1980 | Reider | F23R 3/08 60/754 |
| 4,269,032 | A | * | 5/1981 | Meginnis | F23R 3/002 416/97 A |
| 4,458,479 | A | * | 7/1984 | Reider | F23R 3/02 60/751 |
| 4,825,648 | A | | 5/1989 | Adamson | |
| 5,142,858 | A | | 9/1992 | Ciokajlo et al. | |

(Continued)

*Primary Examiner* — Todd E Manahan
*Assistant Examiner* — Kyle Robert Thomas
(74) *Attorney, Agent, or Firm* — Armstrong Teasdale LLP

(57) ABSTRACT

A combustor assembly for use in a gas turbine engine is provided. The combustor assembly includes a dome assembly, a fuel nozzle coupled to the dome assembly, and a cowl assembly. The cowl assembly includes a radially inner cowl coupled to the dome assembly, and a radially outer cowl including a first cowl member and a second cowl member each positioned about the fuel nozzle. The first and second cowl members substantially align to define a substantially continuous flow path configured to direct a flow of air about the dome assembly.

20 Claims, 4 Drawing Sheets

(56) References Cited

U.S. PATENT DOCUMENTS

| | | | |
|---|---|---|---|
| 5,279,126 | A | 1/1994 | Holladay |
| 5,465,571 | A | 11/1995 | Clark |
| 5,619,855 | A | 4/1997 | Burrus |
| 6,651,439 | B2 | 11/2003 | Al Roub et al. |
| 7,681,399 | B2 | 3/2010 | Orlando et al. |
| 8,720,182 | B2 | 5/2014 | Jain |
| 2010/0162684 | A1 | 7/2010 | Baker |
| 2011/0005231 | A1 | 1/2011 | Low |

* cited by examiner

COMBUSTOR ASSEMBLY FOR USE IN A GAS TURBINE ENGINE AND METHOD OF ASSEMBLING

BACKGROUND

The present disclosure relates generally to turbine engines and, more specifically, to a combustor assembly for use in a gas turbine engine that includes a split cowl configuration.

Rotary machines, such as gas turbines, are often used to generate power with electric generators. Gas turbines, for example, have a gas path that typically includes, in serial-flow relationship, an air intake, a compressor, a combustor, a turbine, and a gas outlet. Compressor and turbine sections include at least one row of circumferentially-spaced rotating buckets or blades coupled within a housing. At least some known turbine engines are used in cogeneration facilities and power plants. Engines used in such applications may have high specific work and power per unit mass flow requirements.

At least some known combustors include an annular inner cowl and an annular outer cowl coupled to a dome assembly. The annular inner and outer cowls define an opening that facilitates channeling air from the compressor towards a premixer for combustion purposes. More specifically, the annular inner and outer cowls extend a distance from the dome assembly in an axially rearward direction such that a first portion of the air from the compressor is channeled through the opening, and such that a second portion of the air is directed around the dome assembly.

While generally effective at deflecting air channeled through the combustor, the annular inner and outer cowls provide an encumbrance to removing components of the combustor for regularly scheduled maintenance. For example, a predetermined amount of axial space between a diffuser and the dome assembly is required to ensure a fuel nozzle coupled to the premixer can be removed from the combustor. More specifically, the fuel nozzle needs to be moved generally in the axially rearward direction to clear the annular outer cowl before being removed from the combustor assembly. As such, the axial space requirement between the diffuser and the dome assembly generally increases the length of the combustor assembly, thereby increasing the weight of the gas turbine engine.

BRIEF DESCRIPTION

In one aspect, a combustor assembly for use in a gas turbine engine is provided. The combustor assembly includes a dome assembly, a fuel nozzle coupled to the dome assembly, and a cowl assembly. The cowl assembly includes a radially inner cowl coupled to the dome assembly, and a radially outer cowl including a first cowl member and a second cowl member each positioned about the fuel nozzle. The first and second cowl members substantially align to define a substantially continuous flow path configured to direct a flow of air about the dome assembly.

In another aspect, a gas turbine engine is provided. The gas turbine engine includes a compressor, and a combustor assembly configured to receive a flow of compressed air from the compressor. The combustor assembly includes a dome assembly, a fuel nozzle coupled to the dome assembly, and a cowl assembly. The cowl assembly includes a radially inner cowl coupled to the dome assembly, and a radially outer cowl including a first cowl member and a second cowl member each positioned about the fuel nozzle. The first and second cowl members substantially align to define a substantially continuous flow path configured to direct a flow of air about the dome assembly.

In yet another aspect, a method of assembling a combustor assembly for use in a gas turbine engine is provided. The method includes coupling a fuel nozzle to a dome assembly, coupling a radially inner cowl to the dome assembly, and positioning a first cowl member and a second cowl member of a radially outer cowl about the fuel nozzle. The first and second cowl members substantially align to define a substantially continuous flow path configured to direct a flow of air about the dome assembly.

DRAWINGS

These and other features, aspects, and advantages of the present disclosure will become better understood when the following detailed description is read with reference to the accompanying drawings in which like characters represent like parts throughout the drawings, wherein.

Figure 1:
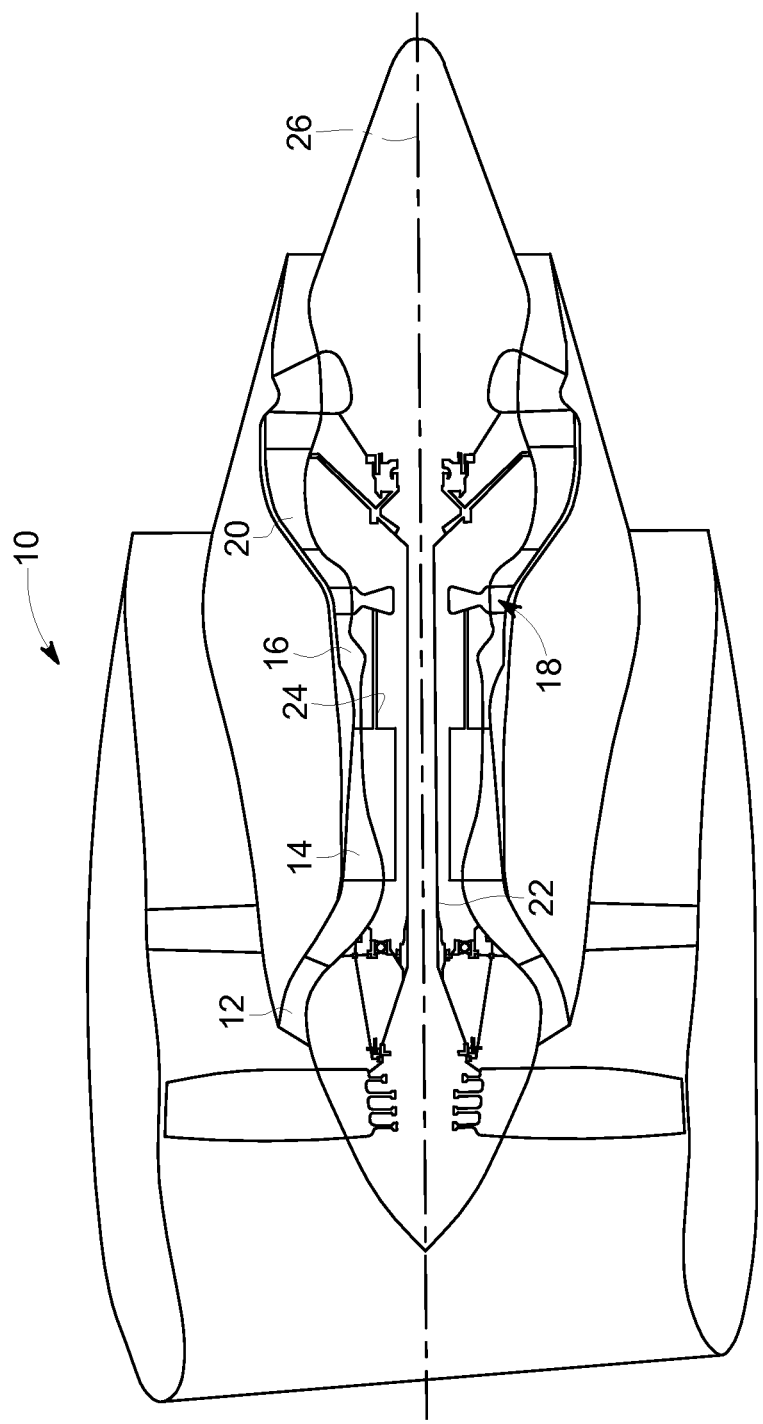
FIG. 1 is a schematic illustration of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to turbine engines and methods of assembling thereof. More specifically, the turbine engines described herein include a combustor assembly utilizing a split cowl configuration. For example, a cowl assembly for use in the combustor assembly includes a split outer cowl formed from a first cowl member and a second cowl member. The first and second cowl members are each positioned about a fuel nozzle, and substantially align when installed to direct a flow of air around a dome assembly of the combustor assembly. Moreover, the first and second cowl members are separate components, which facilitates removal of the fuel nozzle from the combustor assembly in a more efficient manner. In one embodiment, the first and second cowl members are coupled directly to the fuel nozzle and, in another embodiment, the forward cowl member is coupled to the dome assembly and the rear cowl member is coupled to the fuel nozzle. As such, the resulting cowl and fuel nozzle assemblies can be removed from the combustor assembly as a unitary structure, which reduces axial space requirements between the diffuser and the dome assembly, or enables a longer and more aerodynamically efficient cowl assembly to be utilized in the combustor assembly.

As used herein, the terms "axial" and "axially" refer to directions and orientations that extend substantially parallel to a centerline of the turbine engine or a longitudinal axis of the combustor. Moreover, the terms "radial" and "radially" refer to directions and orientations that extend substantially perpendicular to the centerline of the turbine engine or a longitudinal axis of the combustor. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid and steam.

FIG. 1 is a schematic illustration of an exemplary gas turbine engine 10. Engine 10 includes a low-pressure compressor 12, a high-pressure compressor 14, and a combustor assembly 16. Gas turbine engine 10 also includes a high-pressure turbine 18, and a low-pressure turbine 20 arranged in a serial, axial flow relationship. Low-pressure compressor 12 and low-pressure turbine 20 are coupled along a first shaft 22, and high-pressure compressor 14 and high-pressure turbine 18 are coupled along a second shaft 24.

In operation, air flows through low-pressure compressor 12 and compressed air is supplied from low-pressure compressor 12 to high-pressure compressor 14. The compressed air is discharged towards combustor assembly 16 and mixed with fuel to form a flow of combustion gas discharged towards turbines 18 and 20. The flow of combustion gas drives turbines 18 and 20 about a centerline 26 of gas turbine engine 10.

Figure 2:
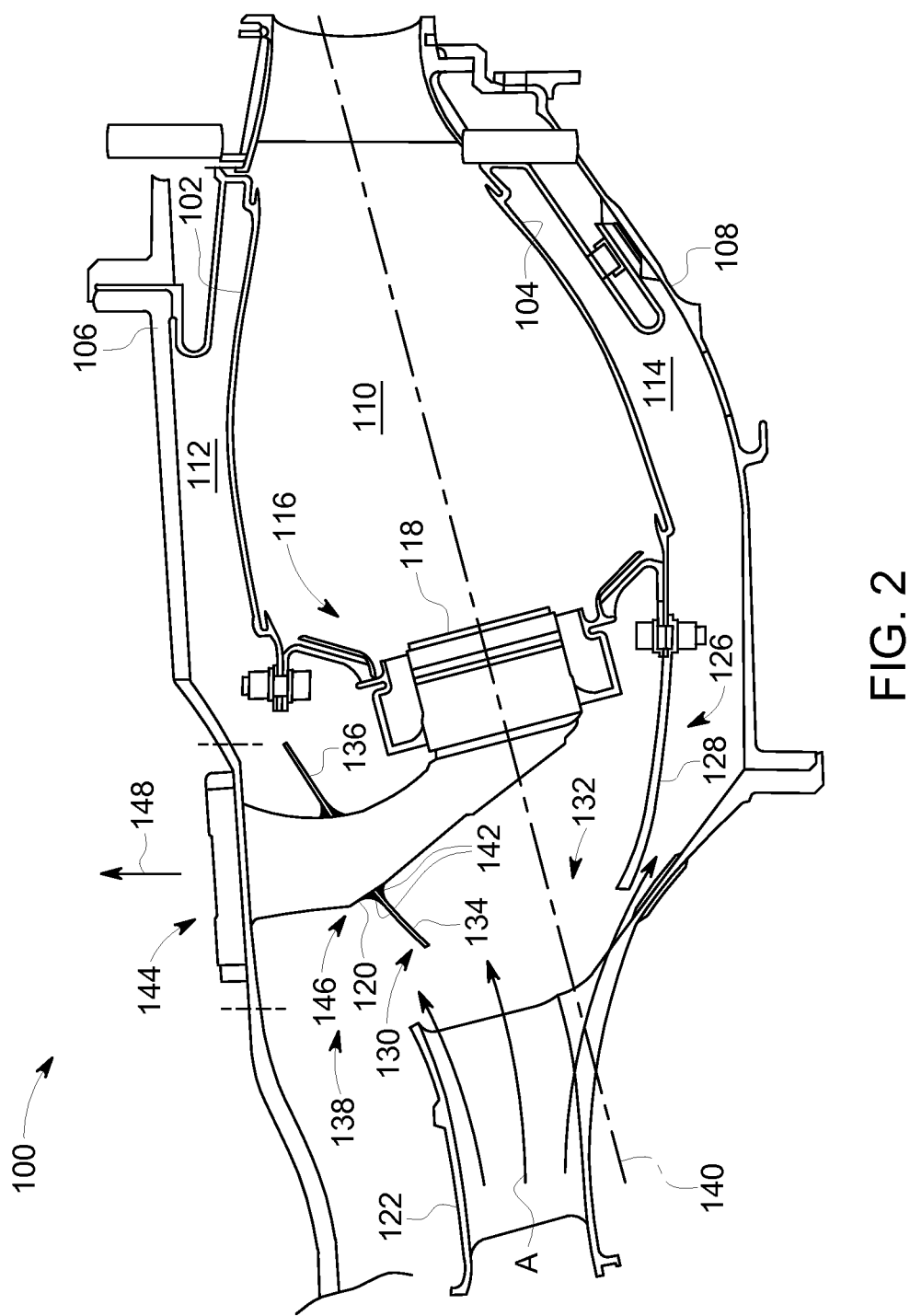
FIG. 2 is a schematic cross-sectional illustration of an exemplary combustor that may be used with the gas turbine engine shown in FIG. 1.

FIG. 2 is a schematic cross-sectional illustration of an exemplary combustor 100 that may be used with gas turbine engine 10 (shown in FIG. 1). Combustor 100 includes an outer liner 102 and an inner liner 104 disposed between an outer combustor casing 106 and an inner combustor casing 108. Outer and inner liners 102 and 104 are spaced radially from each other such that a combustion chamber 110 is defined therebetween. Outer liner 102 and outer combustor casing 106 form an outer passage 112 therebetween, and inner liner 104 and inner combustor casing 108 form an inner passage 114 therebetween. An annular dome assembly 116 extends between, and is coupled to, outer and inner liners 102 and 104 near their upstream ends. A premixer 118 receives fuel from a fuel nozzle 120 coupled to dome assembly 116, and receives compressed air channeled from a diffuser 122 positioned upstream from fuel nozzle 120. Fuel nozzle 120 extends through outer combustor casing 106 to couple to dome assembly 116. The fuel and air are swirled and mixed together by premixer 118, and the resulting fuel and air mixture is discharged into combustion chamber 110.

Combustor 100 also includes a cowl assembly 126 positioned upstream from outer and inner liners 102 and 104. Cowl assembly 126 includes a radially inner cowl 128 coupled to dome assembly 116, and a radially outer cowl 130. Radially inner and outer cowls 128 and 130 define an annular opening 132 therebetween that channels a first portion of compressed fluid from diffuser 122 towards premixer 118 to support fuel-air mixing and to facilitate cooling dome assembly 116. Radially inner and outer cowls 128 and 130 also extend from dome assembly 116 such that a second portion of the compressed fluid is channeled towards outer and inner passages 112 and 114 to facilitate cooling liners 102 and 104.

In the exemplary embodiment, radially outer cowl 130 includes a first cowl member 134 and a second cowl member 136 each positioned about fuel nozzle 120. First and second cowl members 134 and 136 are substantially aligned with each other about fuel nozzle 120 to define a substantially continuous flow path 138 for channeling the second portion of the compressed fluid about dome assembly 116 and towards outer passage 112. More specifically, first cowl member 134 extends in a substantially axially rearward direction from fuel nozzle 120 relative to a longitudinal axis 140 of combustor 100, and second cowl member 136 extends in a substantially axially forward direction from fuel nozzle 120 relative to longitudinal axis 140. As such, flow path 138 extends from dome assembly 116, beyond fuel nozzle 120, and towards diffuser 122.

Moreover, although a gap is defined between dome assembly 116 and second cowl member 136 in FIG. 2 for the sake of clarity, in one embodiment, second cowl member 136 is selectively coupled to both dome assembly 116 and fuel nozzle 120 when fuel nozzle 120 is installed within combustor assembly 16. As such, pressure losses resulting from fluid leakage through the gap is reduced.

In some embodiments, radially inner cowl 128 and radially outer cowl 130 have substantially similar aerodynamic profiles. More specifically, the shape of first and second cowl members 134 and 136 are selected such that a combined aerodynamic profile of radially outer cowl 130 is substantially similar to radially inner cowl 128. Moreover, in one embodiment, first and second cowl members 134 and 136 include aerodynamic features 142 located adjacent to fuel nozzle 120. As such, aerodynamic features 142 facilitate reducing pressure losses of fluid channeled through flow path 138 and around fuel nozzle 120.

In one embodiment, first and second cowl members 134 and 136 are coupled to fuel nozzle 120 forming a first nozzle assembly 144. As will be described in more detail below, first nozzle assembly 144 is selectively removable from combustor assembly 16 (shown in FIG. 1) as a unitary structure. Moreover, radially outer cowl 130 includes a plurality of arcuate segments 146 positioned about dome assembly 116. In the exemplary embodiment, each arcuate segment 146 includes at least one first cowl member 134 and at least one second cowl member 136. As described above, dome assembly 116 has an annular configuration and extends about centerline 26 of gas turbine engine 10. The plurality of arcuate segments 146 are circumferentially aligned about centerline 26 to facilitate forming annular flow path 138. As such, dividing radially outer cowl 130 into arcuate segments 146 enables smaller portions of radially outer cowl 130 to be more easily removed from combustor assembly 16 as part of nozzle assembly 144 for scheduled maintenance. In an alternative embodiment, second cowl member 136 is coupled to dome assembly 116 and extends circumferentially thereabout, such that each arcuate segment 146 includes at least one first cowl member 134.

For example, in operation, first nozzle assembly 144 is selectively removable from combustor assembly 16 as a unitary structure. More specifically, in the exemplary embodiment, first nozzle assembly 144 is capable of translating in a removal direction 148 when fuel nozzle 120 is uncoupled from premixer 118. Coupling first and second cowl members 134 and 136 to fuel nozzle 120 enables first nozzle assembly 144 to translate in removal direction 148 substantially unimpeded by other components within combustor 100. Moreover, coupling first and second cowl members 134 and 136 to fuel nozzle 120 enables removal direction 148 to be angled obliquely relative to longitudinal axis 140. As such, first nozzle assembly 144 is removable from combustor assembly 16 without having to translate fuel nozzle 120 along longitudinal axis 140 towards diffuser 122.

Figure 3:
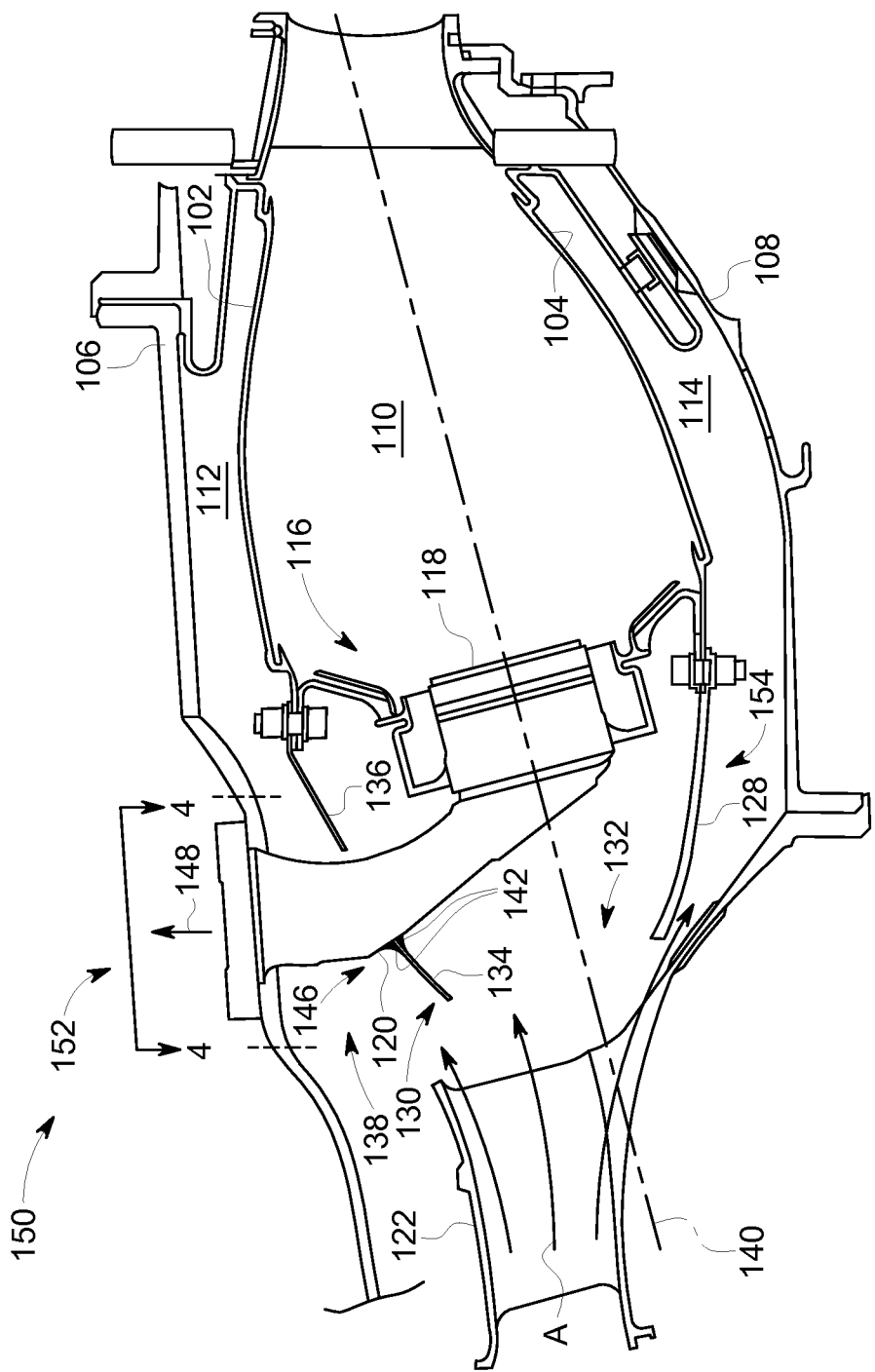
FIG. 3 is a schematic cross-sectional illustration of an alternative combustor that may be used with the gas turbine engine shown in FIG. 1.
Figure 4:
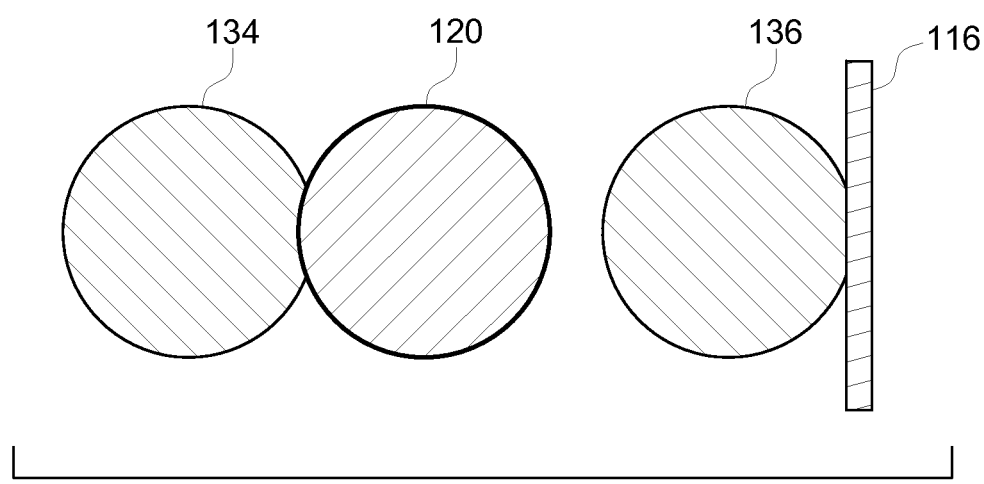
FIG. 4 is a radial view of the combustor shown in FIG. 3 taken along line 4-4.

FIG. 3 is a schematic cross-sectional illustration of an alternative combustor 150 that may be used with gas turbine engine 10 (shown in FIG. 1), and FIG. 4 is a radial view of combustor 150 taken along line 4-4. In the exemplary embodiment, combustor 150 includes cowl assembly 154 positioned upstream from outer and inner liners 102 and 104. Cowl assembly 154 includes radially inner cowl 128 coupled to dome assembly 116, and radially outer cowl 130. Radially outer cowl 130 includes first cowl member 134 and second cowl member 136 each positioned about fuel nozzle 120. First and second cowl members 134 and 136 are substantially aligned with each other to define a substantially continuous flow path 138 for channeling the second portion of the compressed fluid towards outer passage 112. More specifically, first cowl member 134 is coupled to fuel nozzle 120, and second cowl member 136 is coupled, either directly or indirectly, to dome assembly 116. First cowl member 134 extends in a substantially axially rearward direction from fuel nozzle 120 relative to longitudinal axis 140, and second cowl member 136 extends in a substantially axially rearward direction from dome assembly 116 relative to longitudinal axis 140. As such, the positioning and orientation of first and second cowl members 134 and 136 are selected to ensure the substantially continuous flow path 138 is defined when fuel nozzle 120 is installed within combustor assembly 16.

In the exemplary embodiment, first cowl member 134 coupled to fuel nozzle 120 forms a second nozzle assembly 152. In operation, second nozzle assembly 152 is selectively removable from combustor assembly 16 as a unitary structure. More specifically, in the exemplary embodiment, second nozzle assembly 152 is capable of translating in removal direction 148 when fuel nozzle 120 is uncoupled from premixer 118. Coupling first cowl member 134 to fuel nozzle 120 enables second nozzle assembly 152 to translate in removal direction 148 substantially unimpeded by other components within combustor 150. Moreover, coupling first cowl member 134 to fuel nozzle 120 enables removal direction 148 to be angled obliquely relative to longitudinal axis 140. As such, second nozzle assembly 152 is removable from combustor assembly 16 without having to translate fuel nozzle 120 along longitudinal axis 140 towards diffuser 122.

Moreover, although a gap is defined between fuel nozzle 120 and second cowl member 136 in FIG. 3 for the sake of clarity, in one embodiment, second cowl member 136 is coupled to both dome assembly 116 and fuel nozzle 120 when fuel nozzle 120 is installed within combustor assembly 16. As such, pressure losses resulting from fluid leakage through the gap is reduced.

The turbine engine and methods described herein relate to combustor assemblies having a split cowl configuration that facilitates either reducing an axial space requirement between a diffuser and a combustor dome, or enabling more aerodynamically efficient cowls to be utilized therein. For example, the split cowl configuration reduces the axial space requirement by eliminating the need to translate the fuel nozzle towards the diffuser prior to removal. Alternatively, the amount of space between the diffuser and the combustor dome is substantially maintained, and the split cowl configuration enables a length of the cowl to be extended towards the diffuser. More specifically, the split cowl configuration enables the fuel nozzle to be removed from the combustor assembly more efficiently even with cowls of increased length extending between the diffuser and the combustor dome. As such, increasing the cowl length facilitates improving the aerodynamic performance of the cowl assembly to reduce pressure losses of fluid discharged from the diffuser.

An exemplary technical effect of the combustor assembly and methods described herein includes at least one of: (a) reducing a length of the combustor assembly; (b) reducing the weight of the turbine engine; and (c) facilitating maintenance of the turbine engine in a more efficient manner.

Exemplary embodiments of the combustor assembly are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where improving engine configurations is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor assembly for use in a gas turbine engine, said combustor assembly comprising:
    an outer combustor casing;
    a dome assembly;
    a diffuser positioned upstream from said dome assembly, said diffuser comprising a downstream end that defines an exit thereof, wherein said outer combustor casing extends upstream of said downstream end of said diffuser;
    a longitudinal axis, the longitudinal axis oriented at least partially axially and at least partially radially;

a fuel nozzle coupled to said dome assembly; and
a cowl assembly comprising:
a radially inner cowl coupled to said dome assembly;
a radially outer cowl spaced from said radially inner cowl to define an opening configured to channel a pressurized flow of air from said diffuser towards said fuel nozzle, said radially outer cowl comprising a first cowl member and a second cowl member each positioned about said fuel nozzle, wherein said first and second cowl members substantially align to define a substantially continuous flow path configured to direct a flow of air about said dome assembly,
wherein said first cowl member is coupled to said fuel nozzle, said first cowl member extending in a substantially axially rearward direction from said fuel nozzle towards said diffuser positioned upstream of said fuel nozzle and wherein a leading edge of said first cowl member is positioned inboard said exit of said diffuser to permit at least a portion of the pressurized flow of air to be directed outboard of said first cowl member and to flow into a region defined between an outer liner and said outer combustor casing,
wherein said second cowl member is one of:
(i) coupled to said fuel nozzle and extending in a substantially axially forward direction to define a gap between said second cowl member and said dome assembly; or
(ii) coupled to said dome assembly and extending in a substantially axially rearward direction to define the gap between said second cowl member and said fuel nozzle,
wherein the gap is sized to permit another portion of the pressurized flow of air exiting said diffuser to flow therethrough and into the region defined between the outer liner and the outer combustor casing, downstream of the fuel nozzle.

2. The combustor assembly in accordance with claim 1, wherein said first and second cowl members are coupled to said fuel nozzle, thereby at least partially forming a first nozzle assembly, said first nozzle assembly configured to be selectively removed from said combustor assembly as a unitary structure, wherein the first nozzle is removable from the combustor assembly without having to translate the fuel nozzle along the longitudinal axis towards the diffuser.

3. The combustor assembly in accordance with claim 1, wherein said second cowl member is coupled to said dome assembly and extends in a substantially axially rearward direction towards said fuel nozzle, thereby forming a second nozzle assembly, said second nozzle assembly configured to be selectively removed from said combustor assembly as a unitary structure.

4. The combustor assembly in accordance with claim 1, wherein said radially outer cowl comprises a plurality of arcuate segments positioned about said dome assembly, wherein each said arcuate segment comprises at least one first cowl member and at least one second cowl member.

5. The combustor assembly in accordance with claim 1, further comprising at least one aerodynamic feature on at least one of the first cowl member and the second cowl member.

6. The combustor assembly in accordance with claim 5, further comprising at least two aerodynamic features, wherein a first aerodynamic feature is disposed at a radially outward portion of the interface between the first cowl member and the fuel nozzle, and wherein a second aerodynamic feature is disposed at a radially inward portion of the interface between the first cowl member and the fuel nozzle.

7. The combustor assembly in accordance with claim 1, further comprising at least one aerodynamic feature on both the first cowl member and the second cowl member, wherein the aerodynamic feature facilitates reducing pressure losses of the flow of air from the diffuser.

8. The combustor assembly in accordance with claim 1, wherein the fuel nozzle is configured to be removed from the dome assembly along a removal direction, and wherein the removal direction is oriented in a substantially radial direction.

9. A gas turbine engine comprising:
a compressor;
an outer combustor casing;
a diffuser positioned downstream of said compressor, said diffuser comprising a downstream end that defines an exit thereof, wherein said outer combustor casing extends upstream of said downstream end of said diffuser; and
a combustor assembly configured to receive a flow of compressed air from said compressor and channeled through the diffuser, said combustor assembly comprising:
a dome assembly;
a longitudinal axis, the longitudinal axis oriented at least partially in an axial direction and at least partially in a radial direction;
a fuel nozzle coupled to said dome assembly; and
a cowl assembly comprising;
a radially inner cowl coupled to said dome assembly; and
a radially outer cowl spaced from said radially inner cowl to define an opening configured to channel a pressurized flow of air from said diffuser towards said fuel nozzle, said radially outer cowl comprising a first cowl member and a second cowl member each positioned about said fuel nozzle, wherein said first and second cowl members substantially align to define a substantially continuous flow path configured to direct a flow of air about said dome assembly,
wherein said first cowl member is coupled to said fuel nozzle, said first cowl member extending in a substantially axially rearward direction from said fuel nozzle towards said diffuser and wherein a leading edge of said first cowl member is positioned inboard said exit of said diffuser to permit at least a portion of the pressurized flow of air exiting said diffuser to be directed outboard of said first cowl member and to flow into a region defined between an outer liner and an outer combustor casing,
wherein said second cowl member is coupled to said fuel nozzle and extends in a substantially axially forward direction to define a gap between said second cowl member and said dome assembly,
wherein the gap is sized to permit another portion of the pressurized flow of air exiting said diffuser to flow therethrough and into the region defined between the outer liner and the outer combustor casing, downstream of the fuel nozzle downstream of the fuel nozzle.

10. The gas turbine engine in accordance with claim 9, wherein said first and second cowl members are coupled to said fuel nozzle, thereby at least partially forming a first nozzle assembly, said first nozzle assembly configured to be selectively removed from said combustor assembly as a unitary structure, and wherein a combined aerodynamic profile of the radially outer cowl is substantially similar to an aerodynamic profile of the radially inner cowl.

11. The gas turbine engine in accordance with claim 10, wherein said radially outer cowl comprises a plurality of arcuate segments positioned about said dome assembly, wherein each said arcuate segment comprises at least one first cowl member and at least one second cowl member.

12. The gas turbine engine in accordance with claim 11, wherein each said arcuate segment further comprises the fuel nozzle, wherein the fuel nozzle is configured to be removed from the dome assembly along a removal direction, and wherein the removal direction is oriented in a radial direction.

13. The gas turbine engine in accordance with claim 9, wherein said first cowl member and said fuel nozzle at least partially form a second nozzle assembly, said second nozzle assembly configured to be selectively removed from said combustor assembly as a unitary structure, and wherein the first and second cowl members are substantially aligned with each other about the fuel nozzle defining a substantially continuous flow path.

14. A method of assembling a combustor assembly for use in a gas turbine engine, said method comprising:
coupling a fuel nozzle to a dome assembly, the fuel nozzle positioned downstream from a diffuser having a downstream end that defines an exit thereof, wherein an outer combustor casing of the combustor assembly extends upstream of the downstream end of the diffuser;
orienting a longitudinal axis of the combustor assembly at least partially radially and at least partially axially;
coupling a radially inner cowl to the dome assembly; and
positioning a first cowl member and a second cowl member of a radially outer cowl about the fuel nozzle, the radially outer cowl spaced from the radially inner cowl to define an opening configured to channel a pressurized flow of air from the diffuser towards the fuel nozzle, wherein the first and second cowl members substantially align to define a substantially continuous flow path configured to direct a flow of air about the dome assembly,
coupling the first cowl member to the fuel nozzle, wherein the first cowl member extends in a substantially axially rearward direction from the fuel nozzle towards the diffuser positioned upstream of said fuel nozzle and wherein a leading edge of said first cowl member is positioned inboard the exit of the diffuser to permit at least a portion of the pressurized flow of air exiting the diffuser to be directed outboard of said first cowl member and to flow into a region defined between an outer liner and an outer combustor casing,
wherein said second cowl member is one of:
(i) coupled to said fuel nozzle and extending in a substantially axially forward direction to define a gap between said second cowl member and said dome assembly; or
(ii) coupled to said dome assembly and extending in a substantially axially rearward direction to define the gap between said second cowl member and said fuel nozzle,
wherein the gap is sized to permit another portion of the pressurized flow of air exiting the diffuser to flow therethrough and into a region defined between the outer liner and the outer combustor casing, downstream of the fuel nozzle.

15. The method in accordance with claim 14 further comprising:
coupling the first and second cowl member to the fuel nozzle forming a first nozzle assembly; and
selectively removing the first nozzle assembly from the combustor assembly as a unitary structure.

16. The method in accordance with claim 15 wherein selectively removing the first nozzle assembly from the combustor assembly as a unitary structure further comprises removing the first nozzle assembly in a radially outward direction.

17. The method in accordance with claim 16 further comprising angling the first nozzle assembly obliquely relative to a longitudinal direction.

18. The method in accordance with claim 15 further comprising:
extending the second cowl member in a substantially axially forward direction from the fuel nozzle.

19. The method in accordance with claim 14 further comprising:
coupling the first cowl member to the fuel nozzle forming a second nozzle assembly; and
selectively removing the second nozzle assembly from the combustor assembly as a unitary structure.

20. The method in accordance with claim 14 further comprising:
defining an arcuate segment of the radially outer cowl from at least one first cowl member and at least one second cowl member; and
positioning a plurality of arcuate segment about the dome assembly.

* * * * *